O. F. BROWN.
HORSE DETACHER.
APPLICATION FILED MAR. 31, 1910.

1,003,698.

Patented Sept. 19, 1911.

Witnesses
Q. B. Baenziger.
V. C. Spratt.

Inventor
Orlow F. Brown
By Parker & Burton
Attorneys

COLUMBIA PLANOGRAPH CO., WASHINGTON, D. C.

UNITED STATES PATENT OFFICE.

ORLOW F. BROWN, OF LEXINGTON, MICHIGAN.

HORSE-DETACHER.

1,003,698.

Specification of Letters Patent. Patented Sept. 19, 1911.

Application filed March 31, 1910. Serial No. 552,535.

*To all whom it may concern:*

Be it known that I, ORLOW F. BROWN, a citizen of the United States, residing at Lexington, county of Sanilac, State of Michigan, have invented a certain new and useful Improvement in Horse-Detachers, and declare the following to be a full, clear, and exact description of the same, such as will enable others skilled in the art to which it pertains to make and use the same, reference being had to the accompanying drawings, which form a part of this specification.

This invention relates to horse detachers. It has for its object an improved construction and arrangement of a device to release a horse from the thills of a vehicle whenever such release is desired.

The device as a whole comprises means for securing the tugs to the whiffletree and means for securing the holdback straps to the thills, and means for detaching the tugs from the whiffletree; the holdback straps are thereupon automatically released. The release is effected by simultaneously releasing both tugs from the whiffletree, and to the end that they may be simultaneously released each tug is attached to a whiffletree hook, which is more similar to a buckle than the ordinary whiffletree hook, and the release is effected by withdrawing the tongue of the buckle from a hole in the tug. After the tug has been loosened so that the further forward movement of the horse will pull the tug from its engagement with the whiffletree, the holdback straps automatically disengage by pulling forward off from a hook by means of which they were engaged to the thills, and the horse is free to walk out from between the thills.

While I have stated that the device which secures the tugs to the whiffletree is more properly to be compared to a buckle than the ordinary whiffletree hook, I shall mention this device hereinafter as a hook or tug-guide, and mention that part of the device which is movable and which is to be compared to the tongue of a buckle as the catch of the hook.

Figure 1:
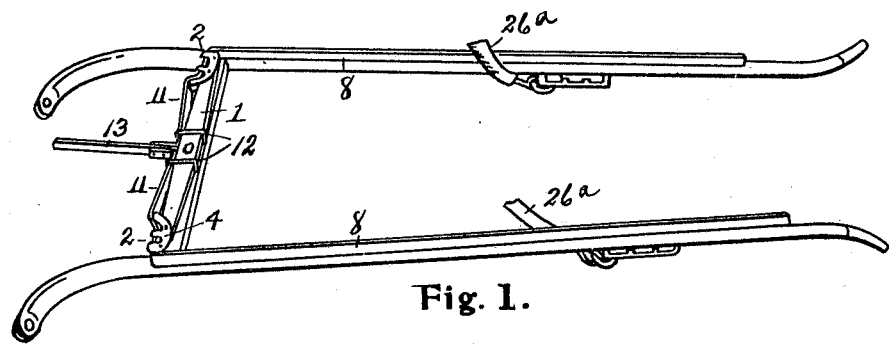
Figure 2:
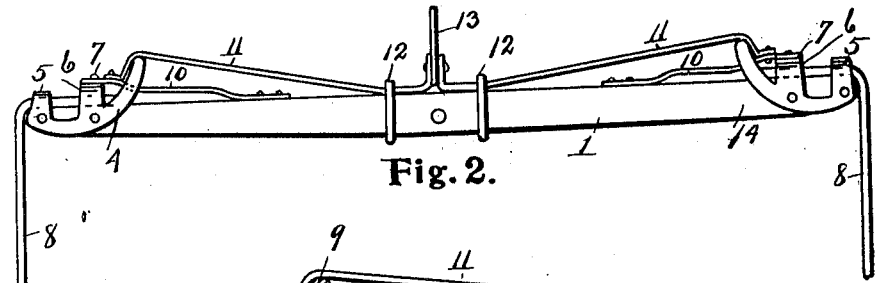
Figure 3:
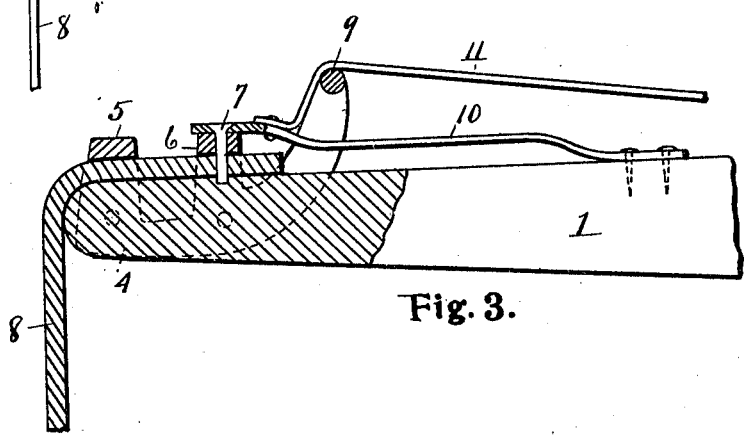

In the drawings:—Figure 1, indicates the relation of the several parts to the thills. Fig. 2, is a plan view of the whiffletree with the attached hooks or tug-guides. It indicates the tugs in position with respect to the hooks. Fig. 3, is an enlarged detail of a whiffletree hook or tug-guide, partly in section.

It requires the coaction of both parts to produce the full release of the horse from the whiffletree, as it is necessary for both parts, that is the tugs and the holdback, to be connected to the thills and the whiffletree in order to make a complete working connection between the horse and the vehicle. The whiffletree 1 may be of any ordinary construction, so far as the tree part of it is concerned. On each end of the tree is the connecting device consisting of a hook or tug-guide 2 that is or may be secured to the whiffletree body in any suitable way, preferably by the cheek members 4 which are fastened thereon, part of each of which engages above the body of the whiffletree and the other below, and the cheek members are connected by cross bars 5 and 6, of which the cross bar 5 is arranged to be brought near the end of the whiffletree body and the cross bar 6 at some little distance back from the end of the whiffletree body. The cross bar 6 is provided with a hole through which the catch or tongue 7 engages. Both the bars 5 and 6 are arranged at the rear of the whiffletree body at a distance sufficient to allow the tug 8 to engage easily between the bars and the whiffletree body. The tug is provided with holes through which the tongue or catch 7 engages. A third cross bar 9 unites the cheek members 4 at a considerable distance farther back from the whiffletree body than the cross bar or fulcrum guide 6. This acts as a fulcrum bar to enable the catch or tongue 7 to be withdrawn from engagement with the tug. The tongue or catch 7 is held on the end of a spring member 10 that is secured to the whiffletree body near the middle thereof. The spring is limited in its movement between the cross bar 9 and the cross bar 6 and carries at its end the catch or tongue 7, which is of such length that it never escapes fully from the cross bar 6 when the spring is pulled entirely back. A flexible strap 11 is secured to the spring at the tongue end, passes over the fulcrum guide 9 under a guide ring 12 that is placed near the middle of the whiffletree and is then attached to a draw strap 13 which is within reach of the occupant of the vehicle. Generally the draw strap 13 hangs over the dash board. A similar arrangement of guide, ring, tongue, spring and draw strap is used with the end 14 of the whiffletree so that both tongues or catches may be withdrawn from the two tugs simultaneously.

With each thill I employ an automatically releasing holdback hook in which the holdback strap 26 engages. A detailed description of this automatic holdback hook is not here given because an understanding of its construction and operation is not necessary for a complete understanding of the whiffletree release.

In use the horse is secured to the vehicle by means of the tug holders which have been described and the holdbacks 26. Both the tugs and the holdbacks act in their usual way and with their usual efficiency, for the usual purpose in the one case of drawing the vehicle forward, and in the other of holding it back at times when the weight of the vehicle would automatically carry it forward, as when the vehicle is passing down some declivity. If, for any reason, it is desired to detach the horse, as in case of the sudden breakage of any parts while the vehicle is in travel, or in case it is desired to detach the horse at the cessation of the use of the vehicle, the only requirement is that the strap 13 be drawn backward with sufficient force to disengage the tongues or catches 7 from the whiffletree, and at once the horse, on continuing his forward movement, disengages the tugs from the whiffletree, and the holdbacks from their retainers, and goes free from the thills.

What I claim is:—

A horse detacher, having in combination a whiffletree, a tug-guide yoked on the end thereof at the rear side and provided with a perforation, a fulcrum member extending rearwardly with reference to the whiffletree, a guide ring near the middle portion of said whiffletree, a tongue normally engaging through the guide perforation, resilient means for holding said tongue in place therein, a tug engaging through said tug-guide and having a perforation registering with the perforation of said guide and a strap attached to said tongue and adapted to partially remove the same from the guide portion and permit the release of the tug, said strap being passed over the fulcrum through the said guide ring and within convenient reach of the driver, substantially as described.

In testimony whereof, I sign this specification in the presence of two witnesses.

ORLOW F. BROWN.

Witnesses:
CHARLES F. BURTON,
WILLIAM M. SWAN.

Copies of this patent may be obtained for five cents each, by addressing the "Commissioner of Patents, Washington, D. C."